(12) United States Patent
Hämäläinen et al.

(10) Patent No.: US 8,243,615 B2
(45) Date of Patent: Aug. 14, 2012

(54) ALLOCATION OF USER EQUIPMENT IDENTIFIER

(75) Inventors: Jyri Hämäläinen, Oulu (FI); Vinh Van Phan, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 1084 days.

(21) Appl. No.: 12/147,153

(22) Filed: Jun. 26, 2008

(65) Prior Publication Data
US 2009/0111476 A1  Apr. 30, 2009

(30) Foreign Application Priority Data

Oct. 29, 2007 (FI) .................................. 20075761

(51) Int. Cl.
*H04L 12/56* (2006.01)
*H04J 1/16* (2006.01)
(52) U.S. Cl. ......... 370/252; 370/278; 370/329; 370/389
(58) Field of Classification Search .................. 370/278, 370/252, 329, 389
See application file for complete search history.

(56) References Cited

U.S. PATENT DOCUMENTS

| | | | | |
|---|---|---|---|---|
| 2002/0168984 A1* | 11/2002 | Wallentin | ....................... | 455/452 |
| 2008/0037478 A1* | 2/2008 | Na et al. | ........................ | 370/338 |

FOREIGN PATENT DOCUMENTS

| | | |
|---|---|---|
| EP | 0752764 A2 | 1/1997 |
| EP | 1418717 A1 | 5/2004 |
| GB | 2435157 A | 8/2007 |
| WO | WO 9805176 A2 | 2/1998 |
| WO | WO 0152589 A1 | 7/2001 |
| WO | WO 2005006829 A2 | 1/2005 |
| WO | WO 2008097489 A2 | 8/2008 |

OTHER PUBLICATIONS

International Search Report for PCT/EP2008/064504 dated Mar. 3, 209.
Written Opinion for PCT/EP2008/064504 dated Mar. 3, 2009.

* cited by examiner

*Primary Examiner* — John Pezzlo
(74) *Attorney, Agent, or Firm* — Squire Sanders (US) LLP

(57) ABSTRACT

A communication system that comprises a base station and a substation connected to the base station. The base station maintains a set of identifiers, each identifier of the set being at least temporarily allocatable to a user equipment for identifying the user equipment when it resides in a cell of the base station. From the set of identifiers of the base station at least one subset of identifiers is extracted, and assigned to the substation. The substation may then respond to a connection establishment request of user equipment by providing it with an identifier from the subset of identifiers assigned to it. The substation also transmits to the base station information on the connection establishment request and on the identifier provided to the user equipment.

23 Claims, 4 Drawing Sheets

| # ALLOCATION OF USER EQUIPMENT IDENTIFIER

FIELD OF THE INVENTION

The present invention relates to telecommunications, and more particularly to identification of user equipment in relayed network configurations.

BACKGROUND OF THE INVENTION

In the highly competitive environment of emerging technologies, extension of wireless network radio signal coverage by use of various types of relays has recently been a target of intensive studies. An amplify-and-forward relay amplifies a received analog signal, and transmits the amplified signal forward. This type of amplification improves the signal power but tends to amplify also the noise received with the actual content of the signal. A decode-and-forward relay regenerates the signal and transmits the regenerated signal forward. During the regeneration, the decode-and-forward relay may apply various digital operations on a received signal. Due to transmission control measures during the regeneration stage, a decode-and-forward relay typically provides better signal quality than an amplify-and-forward relay. Use of decode-and-forward relays to extend the coverage of a single base station is considered to improve the capacity usage of the single base station and to enhance the signal quality received by user equipment.

In communication systems, a protocol defines procedures that provide communication between two or more functions within the same layer in a hierarchy of functions. A generic concern in introducing decode-and-forward relays, or any type of operative substations that perform functions on the received signals in the interface between base station and user equipment, is how to divide information and responsibilities between the operative substation and the base station in such a way that functions in any protocol layer may be implemented without problems or complications, for example in the form of increased delays or signaling load. As an example, in order to be able to provide a base station type radio interface to user equipment direction, a relay node needs to be able to provide several lower layer base station functions for radio resource management, radio bearer control, radio admission control, connection mobility control, and dynamic allocation of resources to user equipment in both uplink and downlink. On the other hand, the base station needs to be aware of the status and related information on at least part of these functions in order to appropriately perform the upper layer functions relying on this information.

A further issue related to introduction of relays is device compatibility. It is likely that relay extensions will be mainly introduced to existing networks with a considerable installed base of network nodes and user equipment. Careful management of compatibility issues is very important, because the infinite number of users, user equipment versions, and user equipment manufacturers eliminate any large-scale transitions to new protocols or procedures. It is therefore essential that user equipment do not need to recognize whether the signal it receives comes from a base station or from a relay node. This means that the transmissions by the relay node should be performed using the same protocols and procedures as in the original transmission by the base station.

A conventional approach to tackle such challenges is to make the intermediate node, here the relay node, to mediate any necessary information in both directions. However, in advanced radio networks, many of the radio interface operations are intensively interactive and would significantly suffer from delays evidently resulting from such message mediation. The increased exchange of signaling messages would also unnecessarily load the overall system resources.

SUMMARY OF THE INVENTION

An object of the present invention is thus to provide a method and an apparatus for implementing the method to enable easy and effective introduction of relay nodes or other operative substations in the interface between user equipment and a base station. The objects of the invention are achieved by, base station, substation, user equipment, communication system and computer program product, which are characterized by what is stated in the independent claims. Other embodiments of the invention are disclosed in the dependent claims.

In an embodiment of the invention a base station maintains a set of identifiers that are at least temporarily allocatable to user equipment for identifying the user equipment when it resides in a cell of the base station. This set of identifiers is divided into one or more mutually exclusive subsets that may be assigned to substations connected to the base station. When a substation receives a radio resource request from user equipment, it is thus able to respond directly to the request of the user equipment by providing it with an identifier from the subset of identifiers assigned to it.

Accordingly, the user identifier allocation may be done quickly, without the conventional delay from the relay node requesting the identifier from the base station. Still, the relay node allocation is valid, because it is able to maintain allocation records of its own allocations. Towards conventional user equipment, the communication procedure looks the same as if it was communicating with the base station; no adjustment to compromise the compatibility of the user equipment is necessary. The invention provides several further advantages that are discussed in more detail in their respective locations in the description of embodiments.

BRIEF DESCRIPTION OF THE DRAWINGS

In the following the invention will be described in greater detail by means of preferred embodiments with reference to the attached drawings, in which.

DETAILED DESCRIPTION OF THE INVENTION

The following embodiments are exemplary implementations of the pre-sent invention. Although the specification may refer to "an", "one", or "some" embodiment(s), reference is not necessarily made to and/or a described feature does not apply to only one particular embodiment only. Single features of different embodiments of this specification may be combined to provide further embodiments that are thus considered to belong to the scope of protection.

Figure 1:
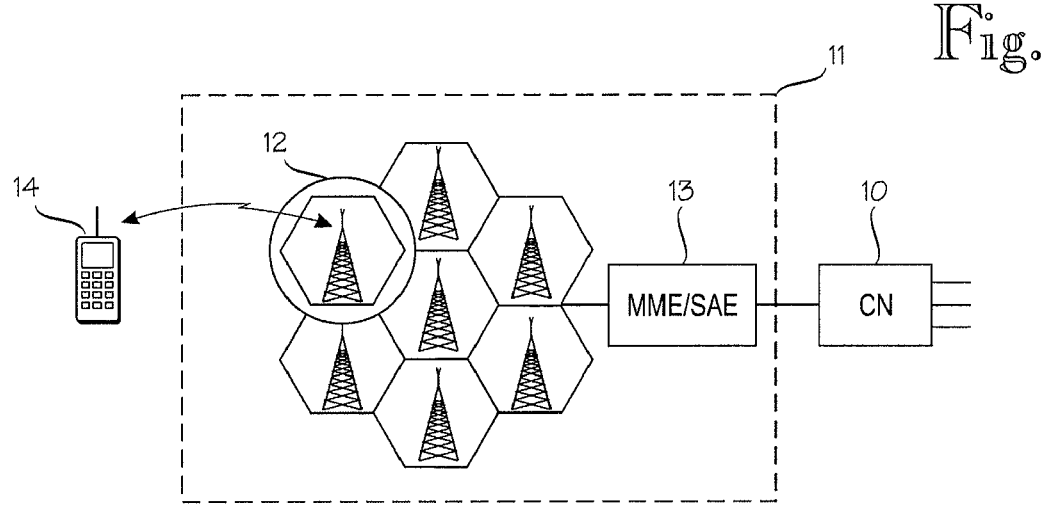
FIG. 1 illustrates a simplified example of a cellular communications system.

The invention may be applied to any communications system where user equipment may be individually addressed by means of an identifier allocatable by an access point. In the following, the invention is described with a cellular system whose working range is covered with cells of several base stations, and the access point corresponds to a base station. FIG. 1 illustrates a simplified structure of such a cellular system. More specifically, the cellular system of FIG. 1 represents a mobile communications system where mobile user equipment may access network services also during movement. It should be noted, however, that even if the invention is illustrated in a mobile communications system, it may be applied also to portable systems, where a portable station may move from point to point but can only be used at a fixed access point at a time.

A mobile network infrastructure of FIG. 1 may be logically divided into core network (CN) 10 and radio access network (RAN) 11 infrastructures. The core network 10 is a combination of exchanges and basic transmission equipment, which together provide the basis for network services. The radio access network 11 provides mobile access to a number of core networks of both mobile and fixed origin.

Based on the cellular concept, in RAN a large area is divided into a number of sub-areas called cells. Each cell has its own base station 12, which is able to provide a radio link for a number of simultaneous users by emitting a controlled low-level transmitted signal. In present mobile communications systems RAN typically comprises a separate controlling network element, which manages the use and integrity of the radio resources of a group of one or more base stations. However, the scope covers also systems without such separate physical element, for example systems where at least part of the radio network control functions are implemented in the individual base stations. For simplicity, in FIG. 1 each cell corresponds to one base station site. A base station site may, however, also comprise more than one base stations, each of which corresponds to an individual cell. A user accesses the services of the mobile communication system with user equipment (UE) 14 that provides required functionality to communicate over a radio interface defined for the radio access network 11.

An example of the cellular network of FIG. 1 is Evolved Universal Terrestrial Radio Access Network (E-UTRAN). In the following the invention is discussed in more detail in the context of E-UTRAN without, however, limiting the scope to the particular standard or by the terms used in describing it. A person skilled in the art can easily apply the instructions to any telecommunication system containing corresponding characteristics.

E-UTRAN cellular radio network comprises an E-UTRAN NodeB (eNB) or an equivalent network element 12, which communicates over bi-directional radio links and with user equipment 14. The user equipment may be fixed, vehicle-mounted or portable. In the E-UTRAN network, eNB is responsible for providing the E-UTRA user plane and control plane protocol terminations towards the user equipment. To achieve this, eNB hosts a variety of functions, including functions for radio resource management, radio bearer control, radio admission control, connection mobility control, and dynamic allocation of resources to user equipment in both uplink and downlink (scheduling).

eNBs may be interconnected with each other by means of a X2 interface. eNBs may also be connected by means of a S1 interface to a EPC (Evolved Packet Core). This S1 interface diversifies more specifically to a S1-MME interface towards MME (Mobility Management Entity) and to a S1-U interface towards the System Architecture Evolution (SAE) Gateway. The S1-interface supports a many-to-many relation between MMEs/SAE Gateways and eNBs. MME is responsible for distribution of paging messages to the eNBs, security control, idle state mobility control, SAE bearer control, and ciphering and integrity protection of NAS signalling. The SAE Gateway primarily hosts the functions for termination of user plane packets for paging reasons, and switching of user plane for support of user equipment mobility.

The eNBs may exchange signals with user equipment over the bi-directional links using given resources and given transmission parameters. In systems that employ link adaptation and user multiplexing, the resources and transmission parameters may be dynamically varied on the basis of channel quality estimations provided by the user equipment. eNB may allocate resources to user equipment in time and in frequency domain. In time domain, eNB schedules the users to transmit or receive data at different time intervals. The utilization of OFDM (orthogonal frequency-division multiplexing) in packet data transmission enables the scheduling to be carried out also in the frequency domain. This means that, at a given time instant, a total frequency band of an OFDM signal is divided into a plurality of frequency blocks (sometimes referred to as physical resource blocks) and the frequency blocks are scheduled to user equipment for data transmission. Each frequency block may be allocated to different user equipment or multiple frequency blocks may be allocated to some user equipment, depending on the radio channel conditions and the network load.

In E-UTRAN, Radio Resource Control (RRC) protocol sublayer provides a plurality of functions, including establishment, maintenance and release of RRC connections and point-to-point radio bearers between UE and E-UTRAN. RRC is also responsible of controlling a number of mobility functions, for example UE cell selection and reselection and context transfer between base stations. RRC uses two states. When user equipment is in RRC_IDLE mode it is provided with cell re-selection mobility but there is no RRC context stored in the base station. When the user equipment transitions into RRC_CONNECTED state UE will acquire an E-UTRAN-RRC connection and establish a context in E-UTRAN. E-UTRAN will thus know the cell that the UE belongs to, and the network can transmit and/or receive data to/from UE. UE monitors the control signalling channel for the shared data channel to see if any transmission over the shared data channel has been allocated to it, and also reports channel quality information and feedback information to E-UTRAN.

For a unique UE identification at the cell level during RRC_CONNECTED STATE, E-UTRAN uses C-RNTI (Cell Radio Network Temporary Identifier). eNB maintains a plurality of C-RNTIs, and allocates these independently to user equipment residing in its cell. C-RNTI is provided to UE during the random access procedure at initial access, after radio link failure, or during a handover that requires a random access procedure. For example, in a contention based initial random access procedure, UE in RRC_IDLE transmits to the base station a Random Access Preamble on a defined random access channel in the uplink and the base station responds by a Random Access Response on the downlink synchronization channel. The Random Access Response comprises an allocation of a temporary C-RNTI for the UE. The Temporary C-RNTI is promoted to C-RNTI for a UE, which detects RA success and does not already have C-RNTI; others drop it. UE that detects RA success and already has a C-RNTI, resumes using its C-RNTI. Control of DL/UL transmissions, for example resource allocation and scheduling, employing C-RNTI is possible after a successfully performed random access procedure. It should be noted that C-RNTI allocation during a random access procedure is used as an example only. Other means for allocating a cell level identifier to UE may be employed without deviating from the scope of protection. Additionally, the scope is not restricted to temporary allocations, but allocations of any duration may be applied.

Figure 2:
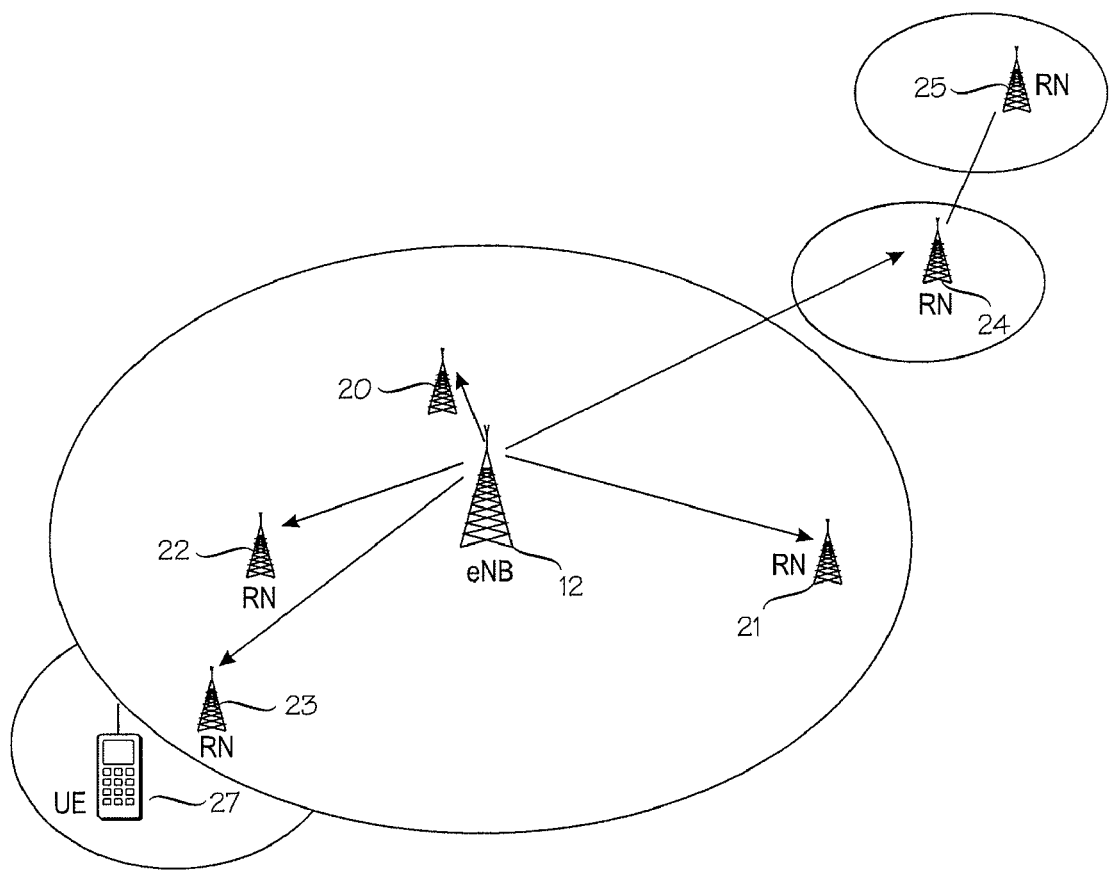
FIG. 2 illustrates exemplary configurations for extending coverage of one of the cells.

Due to possible reduction in backhaul and site acquisition costs, extension of cellular coverage by means of relay stations or relay nodes has been quite strongly promoted for cellular systems. FIG. 2 illustrates exemplary configurations for extending coverage of one of the cells shown in the embodiment of FIG. 1. There are many kinds of relay systems proposed, starting from the simplest one i.e. amplify/forward (applied in single frequency DVB-H networks, for example) ending up to the most complex one, which utilize network codings to improve the overall performance.

The base station 12 of FIG. 2 is connected to a relay node (RN) 20 that detects a signal transmitted by the base station, performs a transmission function on the signal, and retransmits the signal forward. The physical layer between the base station and the relay node may be selected according to the application, for example a fixed or wireless connection may be employed. Each of the relay nodes may be connected to the base station directly or via another relay node. In FIG. 2, relay nodes 20, 21, 22, 24 represent elements that reside within the coverage of the cell and may be used to extend or improve the coverage in areas within the base station cell, for example, provide or improve coverage within buildings, underground locations, or in shadows of buildings or other obstacles. Relay nodes 23, 25, 26 represent elements that are used to extend coverage to areas outside of the base station cell. Such extended areas may exist at the cell edge (cf. RN 23) or outside of the cell (cf. RNs 25, 26).

For compatibility reasons it is essential that the user equipment does not need to recognize whether the signal it receives is transmitted by the base station or the relay node. This means that the transmissions by the relay node towards the user equipment should be performed using the same protocols and procedures as in the original transmission by the base station. However, for improvement of the overall performance it is often necessary that the transmission function of the relay node is not only amplification of the signal, but also comprises defined control and management functions of the base station. For example, in functions for establishing connections and scheduling transmissions, unnecessary delay from crossing relay hops should be avoided by performing at least part of the related functions in the relay node.

For example, in the embodiment of FIG. 2, there is an E-UTRAN cell of eNB 12 with a relay extension RN 23 on the radio-bearer level. A relayed radio bearer dedicated to a given UE 27 is thus relayed via RN 23 and terminated in eNB 12. In order to hide its existence from UE 27, RN 23 supports a group of main eNB functions to provide a sub-cell of the controlling eNB 12 cell. In order to do this, RN 23 also needs to at least partly manage the radio-connection establishment between UE 27 and RN 23. It is clear that the cell-specific identity of the UE 27, that is, C-RNTI, needs to be kept exactly the same on all the hops (i.e., the radio hops of the UE 27 between the UE 27 and RN 23 and between the RN 23 and the eNB 12). Conventionally, this would mean that a connection establishment request from UE 27 needs to be received and re-transmitted from RN 23 to eNB 12, and the response comprising the C-RNTI should be delivered from eNB 12 via RN 23 to UE 27. Such additional delay would, however, not be acceptable in many of the relay node use cases.

Figure 3:
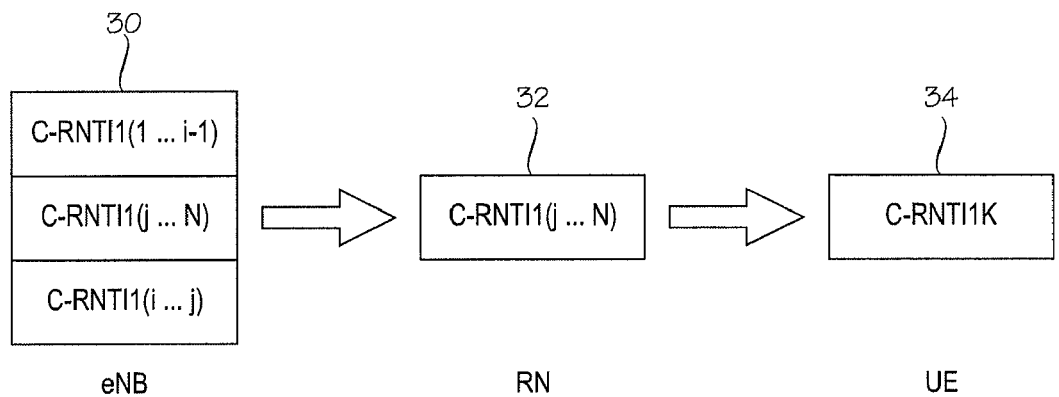
FIG. 3 illustrates this principle of shared address space.

In order to overcome this, it is now proposed that the set of identifiers of the base station is divided into mutually exclusive subsets, and these subsets are controllably assigned to the relay nodes controlled by the base station. A relay node with an assigned subset of identifiers operates as a sub-cell of the controlling base station and preliminarily controls the connection establishment of UEs with the assigned subset of identifiers. FIG. 3 illustrates this principle of shared address space for the embodied system of FIGS. 1 and 2. FIG. 3 shows a set 30 of C-RNTI maintained by the controlling base station eNB 12 (C-RNTI11, C-RNTI12, ... C-RNTI1N). From this set 30 of eNB C-RNTI a subset 32 (C-RNTI1$i$, ..., C-RNTI1$j$) is assigned to relay node RN23. The user equipment UE 27 that detects the coverage area of RN 23 and requests provision of C-RNTI for RRC_CONNECTED status in RN 23 is provided with the identifier C-RNTI1$k$ 34, where k∈{i, ..., j}.

Figure 4:
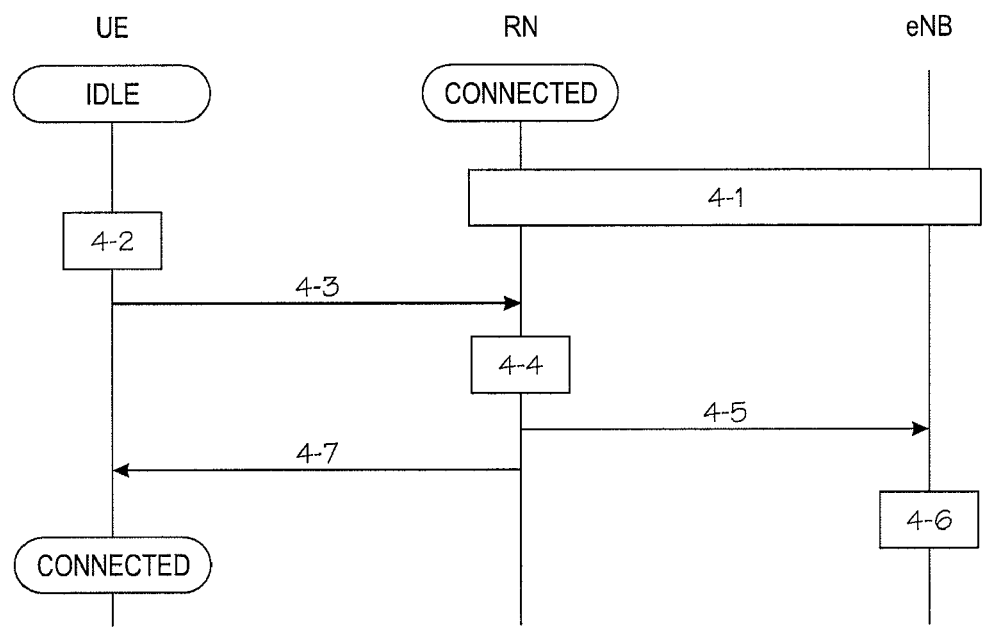
FIG. 4 shows a signaling chart illustrating the corresponding operations in and between a relay node, base station and user equipment.

FIG. 4 shows a corresponding signaling chart illustrating the operations in and between the UE, RN and eNB of the present embodiment. The procedure begins at a situation where the relay node RN has been connected to the base station eNB and is thus in an active and connected state. UE is in idle state but within the coverage of RN. Step 4-1 illustrates an operation for initial assignment of the subset 32 from the eNB set 30 of C-RNTI to the relay node. This initial assignment may be implemented, for example, by means of defined Layer 3 Radio System Control (RSC) protocol message exchange between RN and eNB. In step 4-2 UE detects a trigger for transferring from the RRC_STATE state to the RRC_CONNECTED state and generates a connection establishment request for transmission to the relay node. The trigger may be, for example, a result of a call transmission initiation command input by the user through the user interface of UE. In step 4-3 UE transmits the connection establishment request to the RN. In step 4-4 RN detects the received connection establishment request, allocates C-RNTI1$k$ from subset 32 to UE and generates two messages, one for UE and the other to eNB. The message to UE comprises a connection establishment response a form of which corresponds with the response typically provided by the eNB, and the C-RNTI1$k$ allocation. The message to eNB comprises the connection establishment request in a form that corresponds with the request typically provided by UE and information on the preliminary C-RNTI1$k$ allocation made by RN.

In step 4-5 RN sends the generated connection establishment request to eNB. When eNB receives the request, it performs (step 4-6) its normal C-RNTI procedure but uses the pre-allocated C-RNTI1$k$ it received from RN. In step 4-7 RN sends the generated connection establishment response to UE. When these messages are received and processed by UE and eNB, RRC connection is preliminarily established and a radio resource may be allocated to UE using C-RNTI for further transaction and early transmissions. The term preliminary establishment refers here to an arrangement that allows a further check on the validity of the RN made allocation in eNB and/or further acknowledgements for the RRC connection establishment between any of the parties UE/RN/eNB. It should be noted that the chronological order of messages 4-5 and 4-7 need not necessarily be the one shown in FIG. 4. The steps may be performed in reverse order or even simultaneously.

The proposed arrangement allows provision of C-RNTI to user equipment without additional delay even if the connection between the user equipment and the base station is relayed. The mechanism hides the existence of the relay node from user equipment and allows easier management of device compatibility in the air interface. This is important especially for the compatibility of user equipment functionalities, because the variety of manufacturers and versions for user equipment is large, and functional features and their introduction cannot be controlled to the same extent as with network devices. The base station may process the connection establishment request with its normal procedures, as long as it uses the same identifier that was pre-allocated by the base station. Accordingly, with the proposed arrangement, only minimal changes are required in the base station to support introduction of relays in the network configuration.

Figure 5:
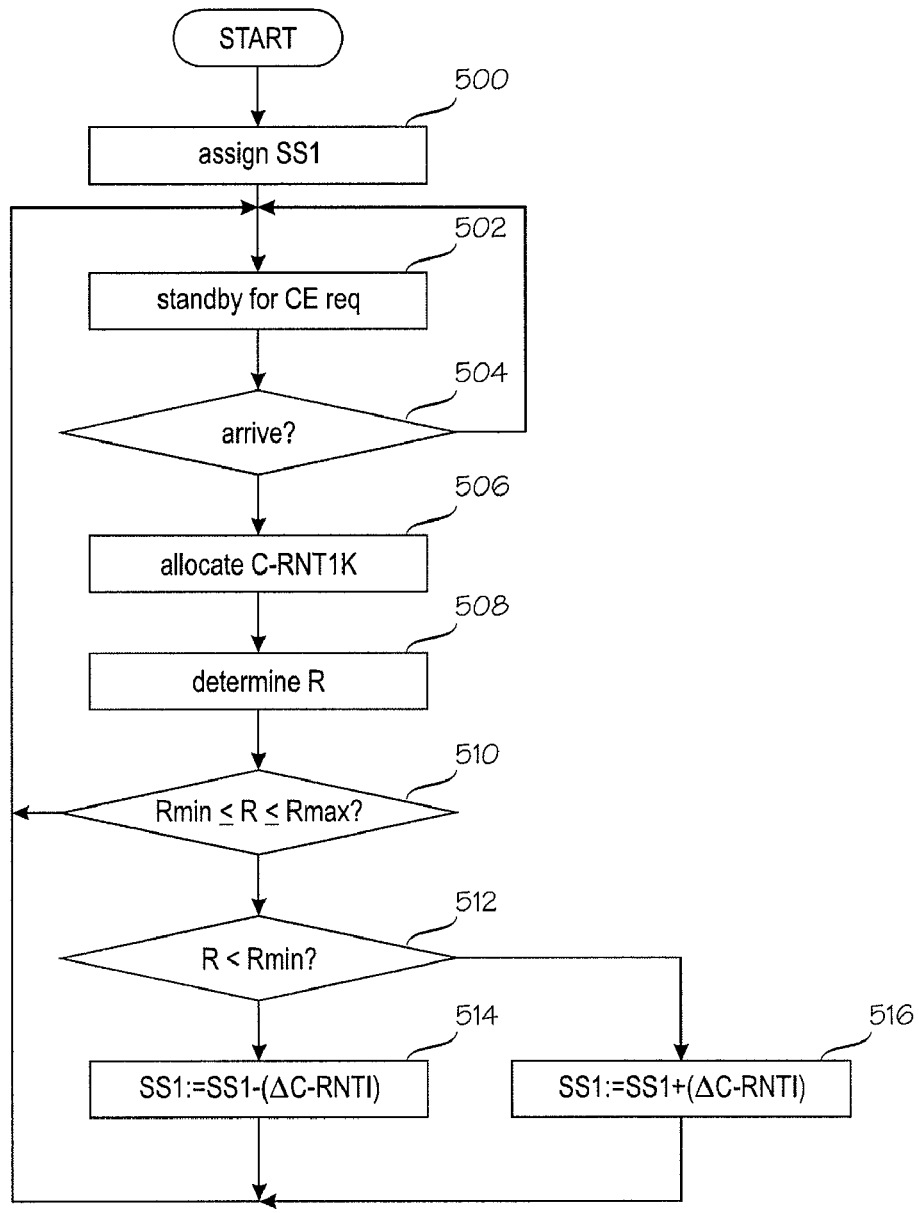
FIG. 5 illustrates a procedure for dynamic assignment of identifiers in a base station.

A further improvement may be achieved by making the assignment of identifiers to relay nodes dynamic. FIG. 5 illustrates this with a procedure for dynamic assignment of identifiers in a base station eNB of FIG. 2. The procedure begins when eNB assigns (step 500) an initial subset SS1:= (C-RNTI1$i$, . . . , C-RNTI1$j$) to RN and becomes standby (step 502) for connection establishment requests CEreq by RN. If a connection establishment request CEreq is received (step 504), eNB validates (step 506) the request by finalizing the RRC connection establishment functions using the C-RNTI1$k$ as the temporary identifier allocated to UE. Otherwise eNB returns to standby state in step 502.

According to the present embodiment, eNB also stores a criterion for controlling the size of the subset SS1. The criterion advantageously identifies a characteristic of the subset assigned to RN and a condition for the characteristic. In the example shown in FIG. 5, the characteristic of the subset is ratio R of the number of C-RNTIs of SS1 presently allocated by RN to UEs to the total number of C-RNTI1N assigned by eNB to RN. The condition for the characteristic defines a lower limit Rmin and an upper limit Rmax for the ratio, and the condition is met when the present ratio R is between the lower limit Rmin and the upper limit Rmax, i.e. Rmin<R<Rmax.

Consequently, eNB determines (step 508) the present value for R and checks (step 510) whether the present value meets the predefined condition. If yes, the present C-RNTI assignment to RN is adequate and no adjustment needs to be made. The procedures returns back to step 502 to wait for the next connection establishment request from RN. If the present value does not meet the predefined condition, eNB checks (step 512) which of the limits is exceeded. If the ratio R is smaller than the lower limit, the assignment of C-RNTIs to RN is too big, and the amount may be reduced (step 514) by cancelling a number ΔC-RNTI of C-RNTIs from RN assignment. If the ratio R exceeds the upper limit, the amount of C-RNTIs assigned to RN is too small and needs to be increased (step 516) by assigning a number ΔC-RNTI of new C-RNTIs to RN. Cancellation and further assignment of C-RNTI to RN may be implemented using a defined RSC protocol communication between eNB and RN. ΔC-RNTI represents here an increment used in adjustment of RN C-RNTI assignment. For a person skilled in the art it is clear that the increments in increasing and decreasing steps may be same or different, or even be varied dynamically. Furthermore, other adjustment mechanisms may be utilized without deviating from the scope of protection.

The proposed dynamic assignment of identifiers provides effective monitoring and utilization of address space, both for the assigned subset of the relay node and for the overall address space of the base station.

As discussed earlier, it is considered important that the user equipment need not know whether the present identifier allocation is made by a relay node or a base station. This is to enable introduction of relay nodes to an existing network that already has an installed base of user equipment. When backward compatibility is ensured, existing user equipment may continue operating in the network without need for essential hardware or software changes in the user equipment. However, it is also possible that subsequent user equipment generations will support functions that make use of features not available in similar form in relay nodes and base stations. In such case, it may be furthermore requested that the user equipment should, when necessary, be able to determine the element from which it receives the C-RNTI allocation.

In a further embodiment of the present invention, this is solved by dividing the original set of identifiers into mutually exclusive subsets, and dividing the subsets to at least two groups such that the first group comprises identifiers allocatable to user equipment by the base station only, and the second group comprises subsets assignable to relay nodes for allocation to user equipment. The format of the identifiers is selected to admit a certain property on the basis of which user equipment is able to associate the identifier to one of these groups and thus determine whether the allocation comes from a relay node or a base station.

Figure 6:
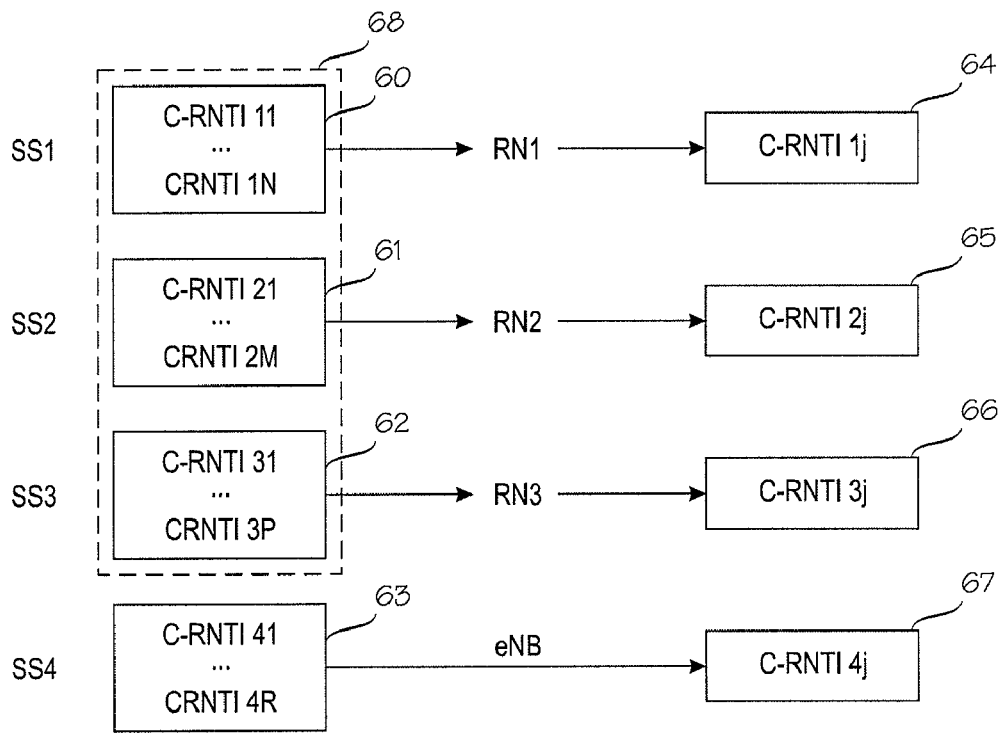
FIG. 6 illustrates a simplified example of address space assignment in the embodied system of FIGS. 1 and 2.

FIG. 6 illustrates a simplified example of such address space assignment in the embodied system of FIGS. 1 and 2. The original address space of eNB comprises identifiers C-RNTI1*, C-RNT12*, C-RNT13*, and C-RNTI4*. These identifiers are divided into subsets SS1, SS2, SS3 and SS4 such that subset SS1 60 comprises identifiers C-RNTI11, . . . , C-RNTI1N, subset SS2 61 comprises identifiers C-RNTI21, . . . , C-RNTI2M, subset SS3 62 comprises identifiers C-RNTI31, . . . , C-RNTI3P, and subset SS4 63 comprises identifiers CRNTI41, . . . , C-RNTI4R. Subset SS4 corresponds to identifiers reserved for direct allocation by eNB to user equipment. The other subsets are assigned by eNB to RNs such that SS1 is assigned to RN1, SS2 is assigned to RN2 and SS3 is assigned to RN3. For example, when user equipment sends a connection establishment request and receives in the response one of the identifiers CRNTI1$j$ 64, C-RNTI2$j$ 65, C-RNTI3 66$j$, it is able to detect from the format of the identifier the association to a subset SS1, SS2, SS3 of a relay node it belongs to, and on the basis of the subset identify a subgroup 68 associated with the type of the provider of the identifier. On the other hand, UE may be arranged to recognize that only identifiers in range C-RNTI4* come from a base station. When it receives a C-RNTI of any other range, it knows that it is communicating through a relay node.

The association to identifier subsets may be based on a variety of properties. The above simple recognition of a digit in the identifier may be used. The identifiers may also be selected such that a checksum computed from the identifier associates either with relay node subsets SS1, SS2, SS3 or with the eNB subset SS4. Fixed classes for identifiers may be used such that a particular rage of identifiers directly associates with any of the classes. In such case dynamic adjustment of identifiers is limited to the range of the relay node allocatable identifiers only.

For clarity, in the above embodiment only two groups were used. For a person skilled in the art it is clear that more than two groups, for example, different groups for different types of substations, may be applied without deviating from the scope of protection.

Figure 7:
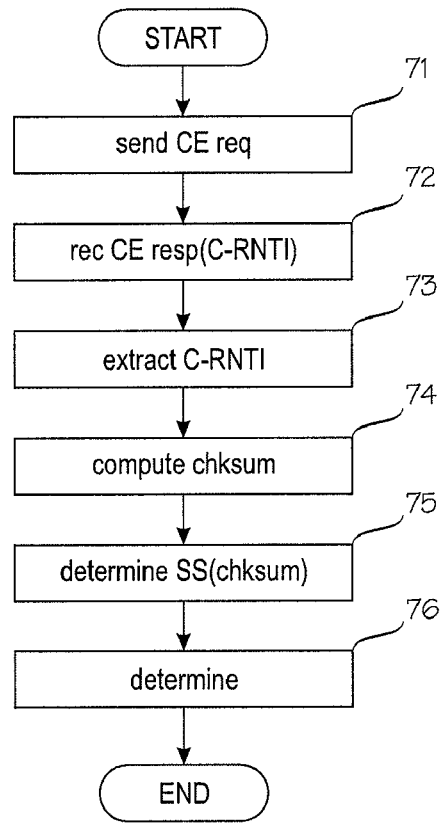
FIG. 7 illustrates a procedure in user equipment in the case of the example of FIG. 6.

FIG. 7 illustrates a procedure in user equipment in the case of the example of FIG. 6. The procedure begins when UE is in RRC_IDLE state and initiates the known procedure for acquiring the C-RNTI for use in RRC_CONNECTED state. UE sends (step 71) a connection establishment request to the network node it has detected in the network, and receives a response comprising a C-RNTI (step 72). UE extracts (step 73) C-RNTI from the response and computes (step 74) a checksum from the C-RNTI. On the basis of the checksum, UE determines (step 75) a subset group or class the C-RNTI belongs to and on the basis of the group or class determines (step 76) whether the assignor of the group is a base station or not.

Figure 8:
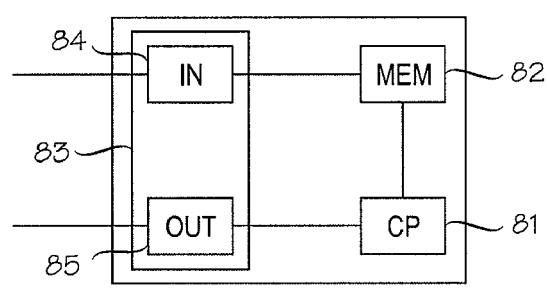
FIG. 8 illustrates an exemplary hardware configuration for the implementation of an apparatus applicable as a base station, relay node or user equipment.

FIG. 8 illustrates an exemplary hardware configuration for the implementation of an apparatus applicable as a base station, relay node or user equipment in the above embodiments. The apparatus comprises a processing unit 81, an element that comprises an arithmetic logic module; a number of special registers and control circuits. Connected to the processing unit is a memory unit 82, a data medium where computer-readable data or programs or user data can be stored. The memory means typically comprise memory modules that allow both reading and writing (RAM), and memory modules whose contents can only be read (ROM). The unit also comprises an interface block 83 with input unit 84 for inputting data for internal processing in the element, and output unit 85 for outputting data from the internal processes of the element.

Examples of said input unit 84 in a base station or a relay node comprise plug-in units acting as a gateway for information delivered to its external connection points. For receiving information from the operator of the network element, the input unit 84 of the base station may also comprise a keypad, or a touch screen, a microphone, or the like. Examples of said output unit 85 in a base station or a relay node include plug-in unit feeding information to the lines connected to its external connection points. For outputting information to the operator of the network element, the output unit 85 may also comprise a screen, a touch screen, a loudspeaker, or the like.

The interface block 83 of the user equipment typically comprises at least a user interface unit for communicating with the user and a radio interface unit for communication over the cellular mobile network. In addition, the user terminal may comprise additional interface units, for communication over another type of cellular network, or in another frequency, or for local communication. Examples of the technologies used for the local communication comprise Wireless Local Area Network (WLAN), Wi-Fi, Wi-Max Bluetooth, Infrared, use of cables, etc. Depending on the application, the implementation of said interface units may comprise a plug-in unit exchanging information through lines connected to external connection points of the user terminal, or light/radio transceiver units with appropriate protocol stacks in the user terminal.

The processing unit 81, memory unit 82, and interface block 83 are electrically interconnected for performing systematic execution of various operations on the received and/or stored data according to the predefined, essentially programmed processes of the element. The computer programs comprise instructions for executing a computer process for implementing the logical units, operations and interfaces of the user equipment, relay node, base station apparatuses, as has been described above. The various embodiments of the invention may be implemented as a combination of computer programs and the respective units disclosed above.

The computer programs may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

In the embodiments above, the relay node has been used to represent an operative substation of a base station. For a person skilled in the art it is clear that other types of operative substations may be applied without deviating from the scope of protection. Another example of a substation is a Home eNB. Home base stations are designed for use in a home or small office as an alternative to WiFi and UMA (Unlicensed Mobile Access). Home eNB enables provision of a coverage and capacity bubble in the home of a user such that users may use their normal cellular UE at tariff rates lower than fixed phones. Accordingly, the user may use a single mobile handset with a built-in personal phonebook for all calls, whether from home or elsewhere. This eliminates user frustration caused by changing between handsets with different interfaces and functionality. One system may comprise different types of substations. For example, in the embodiment of FIG. 6, one subset of subgroups could correspond to identifiers assignable to Home eNBs.

It will be obvious to a person skilled in the art that, as the technology advances, the inventive concept can be implemented in various ways. The invention and its embodiments are not limited to the examples described above but may vary within the scope of the claims.

The invention claimed is:

1. A method, comprising
maintaining in a base station a set of identifiers, each identifier of the set being at least temporarily allocatable to a user equipment for identifying the user equipment when the user equipment resides in a cell of the base station;
connecting a substation to the base station;
extracting from the set of identifiers at least one subset of identifiers;
assigning the subset of identifiers to the substation; and
configuring the substation to respond to a connection establishment request of the user equipment by providing the user equipment with an identifier from the subset of identifiers assigned to the substation and to transmit to the base station information on the connection establishment request and on the identifier provided to the user equipment.

2. A method, comprising:
controlling operations of a base station;
maintaining a set of identifiers, each identifier of the set being at least temporarily allocatable to a user equipment for identifying the user equipment when the user equipment resides in a cell of the base station;
extracting from the set of identifiers at least one subset of identifiers;
assigning the subset of identifiers to a substation;
receiving from the substation a connection establishment request and information on an identifier provided by the substation to user equipment, the identifier being provided from the subset of identifiers assigned to the substation; and
performing a base station function corresponding to the connection establishment request using the identifier provided by the substation as an identifier to be allocated to the user equipment.

3. The method according to claim 2, further comprising:
maintaining a first criterion, the first criterion comprising a definition on a characteristic of the subset of identifiers assigned to the substation and a condition associated with the characteristic;
determining the status of the characteristic in the first criterion;
comparing the status of the characteristic to the condition in the first criterion; and
changing the assignment of the subset of identifiers to the substation if the condition is met.

4. The method according to claim 3, wherein the characteristic comprises a ratio of assigned identifiers to unassigned identifiers in the subset, and the condition comprising at least one threshold level for the ratio.

5. The method according to claim 4, wherein the condition comprises a first threshold level, and the method further comprises:
comparing the ratio of assigned identifiers to unassigned identifiers in the subset to the first threshold level; and
reducing the number of identifiers in the subset in response to the ratio of assigned identifiers to unassigned identifiers in the subset being less than the first threshold level.

6. The method according to claim 4, wherein the condition comprises a second threshold level, and the method further comprises:
comparing the ratio of assigned identifiers to unassigned identifiers in the subset to the second threshold level; and
increasing the number of identifiers in the subset in response to the ratio of assigned identifiers to unassigned identifiers in the subset being more than the second threshold level.

7. The method according to claim 2, further comprising:
extracting from the set of identifiers at least two mutually exclusive subsets of identifiers assignable to substations;
forming from the subsets assignable to subsets a group; and
selecting the format of the identifiers of the subsets in the group to admit a property that allows association with the group.

8. A method, comprising:
controlling operations in a substation of a base station;
receiving from the base station an assignment on a subset of identifiers, the subset being extracted from a set of identifiers maintained in the base station, each identifier of the set being at least temporarily allocatable to a user equipment for identifying the user equipment when the user equipment resides in a cell of the base station;
receiving from the user equipment a connection establishment request;
responding to the connection establishment request by providing the user equipment with an identifier from the assigned subset of identifiers; and
transmitting to the base station information on the connection establishment request and on the identifier provided to the user equipment.

9. The method according to claim 8, further comprising:
receiving from the base station information on reassignment of the subset of identifiers; and
responding, in response to reception of information on reassignment, to the subsequent connection establishment requests by providing the requesting user equipment with an identifier from the reassigned subset of identifiers.

10. A method comprising:
controlling operations in a user equipment;
receiving a connection establishment response;
determining from the connection establishment an identifier for identifying the user equipment when the user equipment resides in a cell of a base station;
determining from the identifier a predefined property;
associating the property to a subset of substations; and
determining the type of the substation according to the associated subset of substations.

11. An apparatus comprising a control unit configured to:
maintain a set of identifiers, each identifier of the set being at least temporarily allocatable to a user equipment for identifying the user equipment when the user equipment resides in a cell of a base station;
extract from the set of identifiers at least one subset of identifiers;
assign the subset of identifiers to a substation;
receive from the substation a connection establishment request and information on an identifier provided by the substation to user equipment, the identifier being provided from the subset of identifiers assigned to the substation; and
perform a base station function corresponding to the connection establishment request using the identifier provided by the substation as an identifier to be allocated to the user equipment.

12. The apparatus according to claim 11, the control unit further configured to:
maintain a first criterion, the first criterion comprising a definition on a characteristic of the subset of identifiers assigned to the substation and a condition associated with the characteristic;
determine the status of the characteristic in the first criterion;
compare the status of the characteristic to the condition in the first criterion; and
change the assignment of the subset of identifiers to the substation if the condition is met.

13. The apparatus according to claim 12, wherein the characteristic comprising a ratio of assigned identifiers to unassigned identifiers in the subset, and the condition comprising at least one threshold level for the ratio.

14. The apparatus according to claim 13, wherein the condition comprises a first threshold level, and the control unit is further configured to:
compare the ratio of assigned identifiers to unassigned identifiers in the subset to the first threshold level; and
reduce the number of identifiers in the subset in response to the ratio of assigned identifiers to unassigned identifiers in the subset being less than the first threshold level.

15. The apparatus according to claim 13, wherein the condition comprises a second threshold level, and the control unit is further configured to:
compare the ratio of assigned identifiers to unassigned identifiers in the subset to the second threshold level; and
increase the number of identifiers in the subset in response to the ratio of assigned identifiers to unassigned identifiers in the subset being more than the second threshold level.

16. The apparatus according to claim 11, the control unit further configured to:
extract from the set of identifiers at least two mutually exclusive subsets of identifiers assignable to substations;
form from the subsets assignable to substations a group; and select the format of the identifiers of the subsets in the group to admit a property that allows association with the group.

17. An apparatus comprising a control unit configured to:
receive from a base station an assignment on a subset of identifiers, the subset being extracted from a set of identifiers maintained in the base station, each identifier of the set being at least temporarily allocatable to a user equipment for identifying the user equipment when the user equipment resides in a cell of the base station;
receive from the user equipment a connection establishment request;
respond to the connection establishment request by providing the user equipment with an identifier from the assigned subset of identifiers; and
provide for transmission to the base station information on the connection establishment request and on the identifier provided to the user equipment.

18. The apparatus according to claim 17, the control unit further configured to:
receive from the base station information on reassignment of the subset of identifiers; and
respond, in response to reception of information on reassignment, to the subsequent connection establishment requests by providing the requesting user equipment with an identifier from the reassigned subset of identifiers.

19. The apparatus according to claim 17, further comprising an interface unit of a substation that comprises an interface for communicating with the user equipment and an interface for communicating with the base station such that said substation is configured to operate as a relay node or a home base station.

20. An apparatus comprising a control unit configured to:
receive a connection establishment response;
determine from the connection establishment an identifier for identifying user equipment when the user equipment resides in a cell of a base station;
determine from the identifier a predefined property;
associate the property to a subset of substations; and
determine the type of the substation according to the associated subset of substations.

21. A communication system, comprising a base station maintaining a set of identifiers, each identifier of the set being at least temporarily allocatable to a user equipment for identifying the user equipment when the user equipment resides in a cell of the base station, and a substation connected to the base station;
the base station being configured to extract from the set of identifiers at least one subset of identifiers, and assign the subset of identifiers to the substation;
the substation being configured to respond to a connection establishment request of the user equipment by providing the user equipment with an identifier from the subset of identifiers assigned to the substation.

22. A non-transitory computer program product readable by a computer and encoding a computer program of instructions for executing a computer process for controlling operations of a base station, the process including:
maintaining a set of identifiers, each identifier of the set being at least temporarily allocatable to a user equipment for identifying the user equipment when the user equipment resides in a cell of the base station;
extracting from the set of identifiers at least one subset of identifiers;
assigning the subset of identifiers to a substation;
receiving from the substation a connection establishment request and information on an identifier provided by the substation to user equipment, the identifier being provided from the subset of identifiers assigned to the substation; and
performing a base station function corresponding to the connection establishment request using the identifier provided by the substation as an identifier to be allocated to the user equipment.

23. A non-transitory computer program product readable by a computer and encoding a computer program of instructions for executing a computer process for controlling operations in a substation of a base station, the process including:
receiving from the base station an assignment on a subset of identifiers, the subset being extracted from a set of identifiers maintained in the base station, each identifier of the set being at least temporarily allocatable to a user equipment for identifying the user equipment when the user equipment resides in a cell of the base station;
receiving from the user equipment a connection establishment request;
responding to the connection establishment request by providing the user equipment with an identifier from the assigned subset of identifiers; and
transmitting to the base station information on the connection establishment request and on the identifier provided to the user equipment.

* * * * *